June 14, 1932.  J. V. PUGH  1,862,804
VEHICLE WHEEL
Filed Sept. 11, 1928  7 Sheets-Sheet 1

J. V. Pugh
INVENTOR

June 14, 1932.  J. V. PUGH  1,862,804
VEHICLE WHEEL
Filed Sept. 11, 1928  7 Sheets-Sheet 2

J. V. Pugh
INVENTOR

By Marks & Clerk
Attys.

June 14, 1932.   J. V. PUGH   1,862,804
VEHICLE WHEEL
Filed Sept. 11, 1928   7 Sheets-Sheet 3

J. V. Pugh
INVENTOR

June 14, 1932.  J. V. PUGH  1,862,804
VEHICLE WHEEL
Filed Sept. 11, 1928   7 Sheets-Sheet 4

J. V. Pugh
INVENTOR

By Marks & Clarke
Attys.

June 14, 1932.  J. V. PUGH  1,862,804

VEHICLE WHEEL

Filed Sept. 11, 1928  7 Sheets-Sheet 5

J. V. Pugh
INVENTOR

Patented June 14, 1932

1,862,804

UNITED STATES PATENT OFFICE

JOHN VERNON PUGH, OF MERIDEN, ENGLAND

VEHICLE WHEEL

Application filed September 11, 1928, Serial No. 305,253, and in Great Britain October 20, 1927.

This invention relates to vehicle wheels of the type having wire or like spokes which are subjected to tension and in which the spoke sets are connected to independent members say at the two ends of the hub so that tension in the spokes may be regulated by moving said members relative to one another say in the direction of the axis of rotation of the wheel.

In such a wheel a member or spoke connecting means at the inside end of the hub must be capable of passing over an abutment or other supporting means which co-operates with the member or spoke connecting means on the outside end of the hub and for this purpose a central aperture of sufficient size may be provided. If the outer end abutment is large and the inner end member in addition to passing over it is in the form of a flange or other continuous ring which will provide facilities for the necessary attachment of the wheel part to the vehicle by a series of bolts the inner member will also be large and consequently of considerable weight.

With the spokes arranged to be tightened by moving apart in an axial direction two members as above indicated the exterior set of spokes may project outward some distance from the front edge of the rim at any rate over the central region of the spoking and also some of the inside spokes may be inclined in the opposite direction to the exterior set of spokes and sloped inwards from their points of connection to the rim:

Under the above conditions when the wheel forming structure is detached from the hub or axle any pressure in an axial direction exerted upon the members to which spokes are attached will push the spokes into positions more nearly parallel with the central plane of the wheel and thus cause the ends to be pushed through the rim in a radially outward direction with possible damage to the tyre. The detached wheel is also unstable and difficult to manipulate or fit with a tyre.

The object of the present invention is to provide an improved wheel part of the type indicated which will be of simple and light construction and can be attached to a vehicle by a plurality of bolts or the like while it is also free from the foregoing objections.

The invention consists in a tyre carrying rim and wire spoke supporting structure which is completly removable from the wheel hub.

The invention further consists in a tyre carrying rim and wire spoke supporting structure having two or more groups of spokes, those of each goup radiating from a centre not coaxial with the wheel centre.

The invention further consists in a wheel forming structure having two or more sets of spokes at least one containing two or more groups radiating to the rim from two or more centres disposed round the wheel axis and said sets of spokes being adapted to acquire suspensory and torque-resisting tensions by their relative axial displacement.

The invention further consists in a wheel with sets of spokes passing from the rim inwards to spoke connection means axially saparable to tension the spokes in which a central spoke connection means is positioned upon an abutment surrounded by separate spoke connection means and retention of the wheel on the vehicle and tensioning of the spokes is effected by the same attachment devices.

The invention further consists in a wheel as indicated in which a set of spokes on the side of the wheel remote from the vehicle is connected to a central ring mountable upon a spigot of an axle end or other central abutment while the inner side set of spokes is divided to form a plurality of groups which are each connected to an eyelet and said eyelets are fitted upon a series of bolts or like devices which retain the wheel upon a vehicle and exert tension upon the spokes.

The invention further consists in a wheel in accordance with the preceding paragraphs in which the spokes are grouped in such a manner that the resultant forces in the groups retain the eyelets in the correct positions to correspond with the wheel retaining devices.

The invention further consists in a wheel in accordance with any of the paragraphs other than the one preceding in which two eyelets are positioned upon a retaining device and the spokes are oppositely directed from each eyelet to the wheel rim while tightening of the two eyelets upon the retaining device is adapted to move them relatively to one another and to exert tension on the spokes connected therewith.

The invention further consists in a wheel with sets of spokes passing from the rim inward to spoke connection means axially separable to tension the spokes in which a central spoke connection means remote from the vehicle is positioned upon a centering means provided with an adjustable shoulder or like abutment while spokes for the side adjacent to the vehicle are engaged by a series or group of attachment means adapted to retain a wheel and transmit driving or other forces, all the spokes being tensioned by adjustment of the shoulder or like abutment.

The invention further consists in a wheel having outer side and inner side sets of spokes which are tensioned by axial separation in the regions of the wheel axis of the two sets in which headed spokes are inserted through apertures in the rim to effect an inner end screw thread connection and after tensioning are fastened to the rim by the heads at their outer ends.

The invention further consists in a wheel as indicated having outer side spokes connected to a central ring and inner side spokes grouped at a plurality of rings which are forced in an axial direction from the central ring when mounting the wheel in which the spokes are threaded at the inner end and provided at the outer end with flattened heads which are seated around apertures in the rim through which the spokes are passed to screw into tapped holes in the rings and after screwing up the spoke heads are fastened at or round their edges to the rim for example by soldering, welding or other treatment.

The invention also consists in improvements in or relating to vehicle wheels as hereinafter described.

Referring now to the accompanying drawings:—

Figure 1:
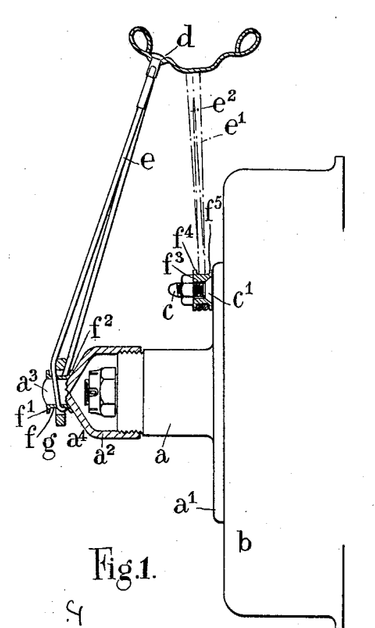
Figures 1 and 2 show a construction in accordance with the invention and having spokes upon both sides disposed as hairpin bends around eyelets which are positioned upon a central abutment and the holding-on bolts, the spokes being attached to the rim by nipples.

In carrying the invention into effect in one convenient form as shown in Figure 1 an inner hub $a$ rotatable upon an axle end is provided with a suitable flange $a'$ for attaching a wheel to a vehicle in a manner common in constructions which are generally known as "bolted-on" wheels, the said flange also if desired forming an attachment means for a brake drum $b$.

The inner hub part $a$ is provided with a cap $a^2$ having at its extreme outer end or at a distance from the flange equal to the length of an ordinary hub a spigot or peg $a^3$ concentric with the axis of rotation and projecting from a conical shoulder or like abutment $a^4$.

The flange $a'$ is made of sufficient size to provide at a reasonable distance within its outer edge for attachment points sufficiently removed from the axis of rotation to act as a tangent circle for the tension spokes of a wire or like spoked wheel.

Figure 2:
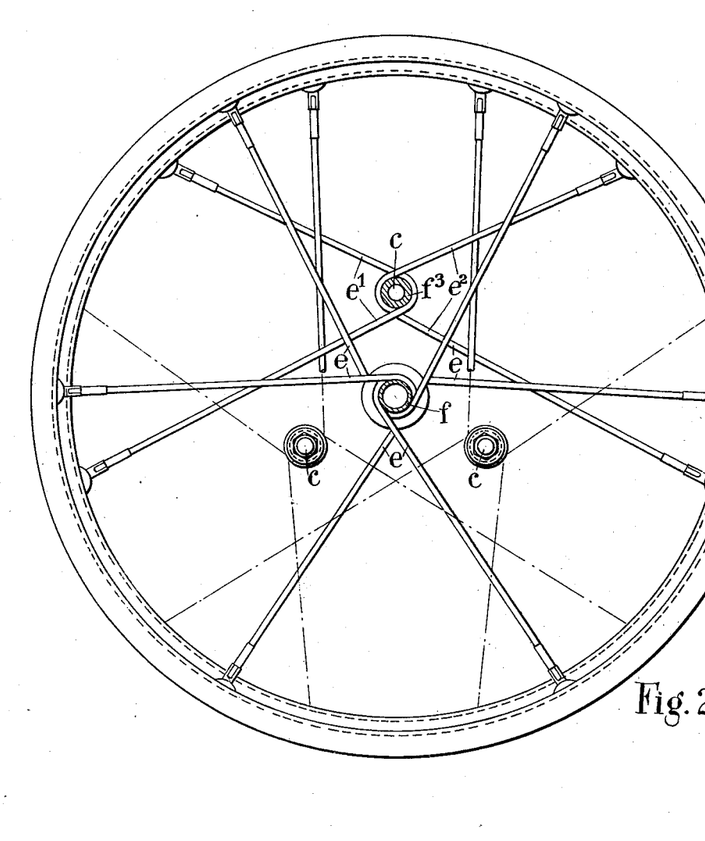

The flange $a'$ as shown in Figure 2 is provided at points such as above indicated with a series of three or if desired other suitable number of studs or bolts $c$ for the attachment of the wheel, the projecting portions of the studs, bolts or the like being partly parallel and partly tapered as at $c'$ in this form, but varying in others as hereinafter more fully described.

A wheel forming structure for fitting upon a hub, axle end or the like as before described is formed from an ordinary rim $d$ provided with two sets of bent spokes $e$ and $e'$, $e^2$ which spring from one edge and from the centre of the rim or may if desired spring from the two opposite edges. The outer set of spokes $e$ is connected to a ring and eyelet hereinafter more fully described which is adapted to fit upon the before-mentioned spigot $a^3$ upon the end of the hub.

In one convenient construction for the outer spokes shown in Figure 1 the eyelet $f$ with flanges $f'$, $f^2$ fits upon the spigot $a^3$ and the ring $g$ is made of a greater diameter to allow of a turn of the spoke wire between the eyelet $f$ and the interior of the ring. The set of spokes $e$ is formed from a plurality of hairpin bends each of which encircles the eyelet $f$ within the ring $g$ and has one leg positioned at the front and the other at the back of said ring, the two ends being attached to the edge of the rim $d$ by nipples in the well-known way as shown or in any other suitable manner.

For the set of spokes $e'$ $e^2$ upon the inner side of the wheel eyelets $f^3$ having grooves upon the exterior thereof between the flanges $f^4$, $f^5$ are positioned upon each of the attachment devices $c$, $c'$ for the wheel part and within the groove of each eyelet are positioned in Figures 1 and 2 the loops of two hairpin bends $e'$, $e^2$ of spoke wire, the ends of which bends are carried to the rim and connected to the centre thereoef in the same manner as the spokes of the set $e$ on the outer side of the rim.

The two hairpin bends $e'$, $e^2$ upon the eyelet $f^3$ are as shown led to the rim in opposite directions so that the resultant forces in the two hairpin bends are opposite to one another and the spokes when the wheel part is disconnected retain the eyelets $f^3$ in the correct positions for coinciding with the attachment devices $c$, $c'$ for the wheel part.

The spoke lengths will be so arranged in the two sets $e$ and $e'$, $e^2$ that the tightening up of the attachment devices to retain the wheel upon the vehicle will separate the two spoke sets from one another at their inwardly directed ends or roots so that all the spokes are tensioned by the act of attaching the wheel part to the vehicle, the connection means or eyelet $f$ and ring $g$ to which the outer set of spokes $e$ are attached being retained in its correct position by the before-described shoulder $a^4$ at the inner end of the spigot $a^3$ on the axle end or hub.

Figure 3:
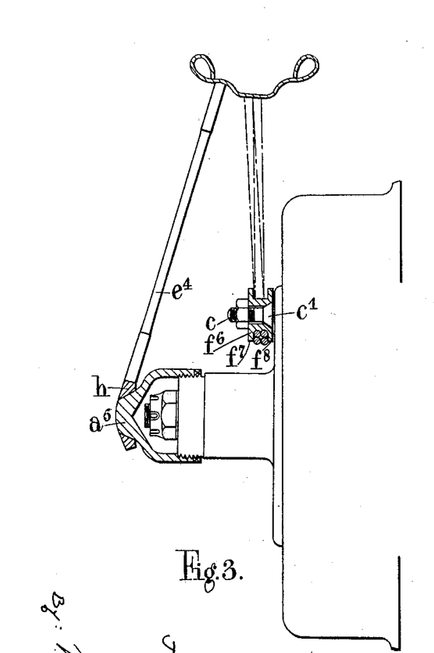
Figures 3 and 4 show a modification in which the outer spokes are welded to a ceneral ring or eyelet and to the rim while the inner spokes are welded to the rim and bent round the eyelets co-operating with the holding-on bolts.
Figure 4:
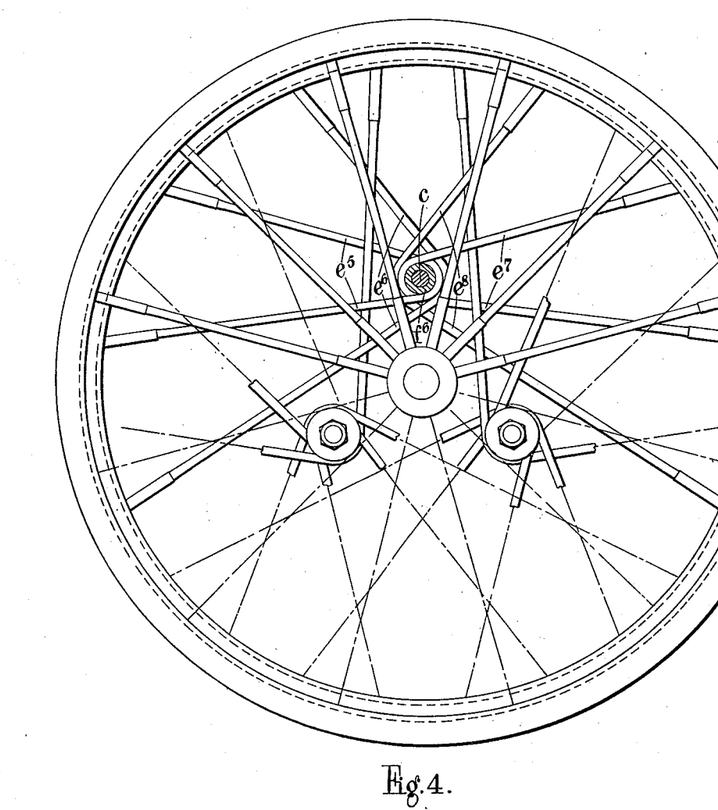

Instead of employing hairpin bend spokes only and attaching them to the rim by means of nipples or the like the spokes may be welded or otherwise fastened either at their inner or outer or both ends. In Figures 3 and 4 all the spokes are welded to the rim and the spokes $e^4$ for the set on the side of the wheel remote from the vehihcle are welded at their inwardly directed ends to a single ring $h$ which is positioned upon the conical spigot or abutment $a^5$. The spokes of the set $e^5$, $e^6$, $e^7$ and $e^8$ upon the side of the wheel adjacent to the vehicle are in the manner before described looped round the eyelets $f^6$ which fit upon the wheel attachment devices, $c$, $c'$ and are provided with wide flanges $f^7$, $f^8$ so as to retain the four spoke loops as shown.

Figure 5:
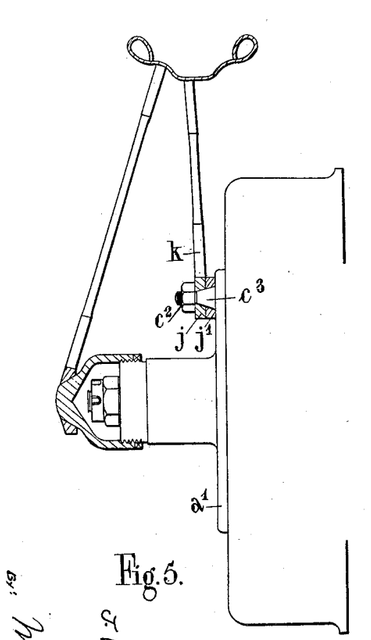
Figures 5, 6 and 7 show another construction in which the outer spokes are the same as in the last-described figures while the inner spokes are welded to the rim and two eyelets are positioned upon each holding-on bolt and arranged for a slight displacement relative to one another to tension the spokes in the tightening up of the holding-on bolts.
Figures 6, 7:
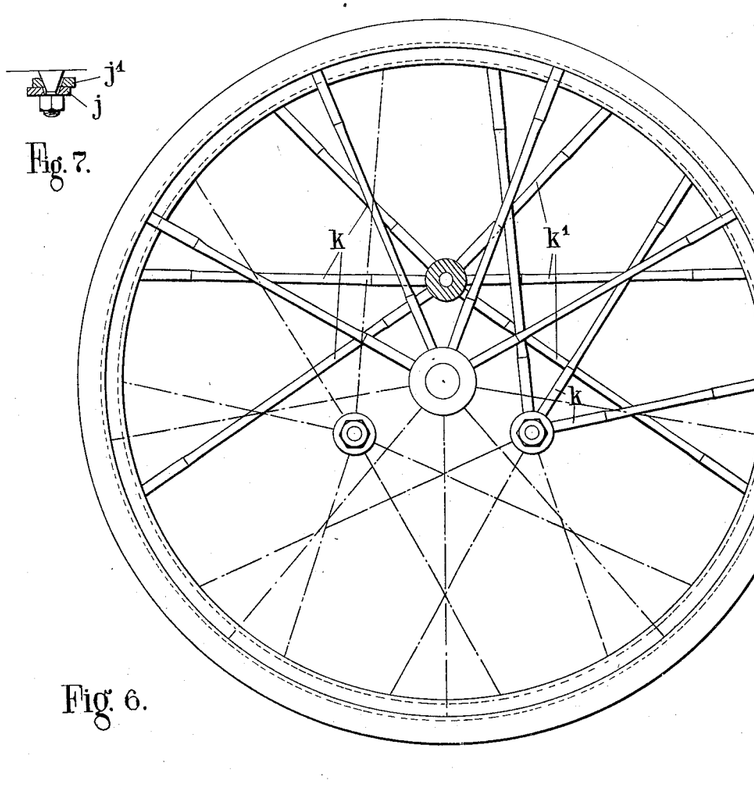

The inwardly directed ends of the spokes upon the side of the wheel adjacent to the vehicle may also be welded to the eyelets or rings and in some instances as shown in Figures 5, 6 and 7 an attachment device $c^2$, $c^3$ may be provided with two eyelets $j$, $j'$ side by side and spokes $k$ from the eyelet $j$ may be carried in one direction to the rim of the wheel and spokes $k'$ from the eyelet $j'$ may be carried in the opposite direction to the wheel rim as hereinafter more fully described. In such a construction the eyelets may be made with tapering central apertures which before mounting a wheel part are somewhat eccentric to one another, the inner eyelet $j'$ having a larger diameter aperture than the outer one and the attachment devices $c^2$, $c^3$ for the wheel part may be tapered as at $c^3$ through both eyelets so that as the two eyelets are tightened thereon the eyelets will be moved relative to one another in opposition to the forces in the spokes connecting them with the rim. In this way part of the tension may be applied to the spokes while the other part may be applied by the separation in an axial direction of the inner ends of the spoke sets in the manner already described. Hairpin bends or screwed spokes may also be employed in this way.

Figure 8:
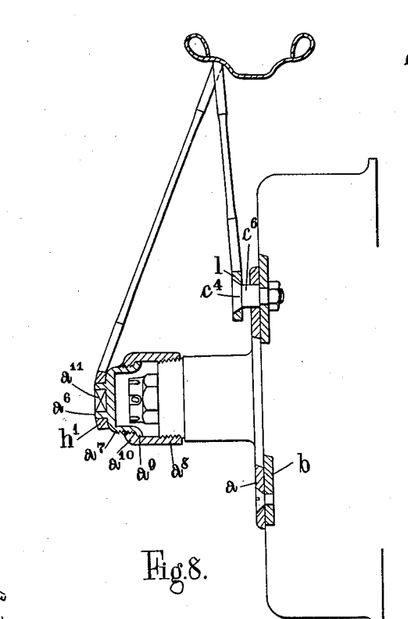
Figures 8, 9 and 10 show an arrangement in which the inner set of spokes is first engaged with the holding-on means and the tensioning of the wheel is effected by outward displacement of the abutment carrying a central ring or eyelet for the outer set of spokes.
Figures 9, 10:
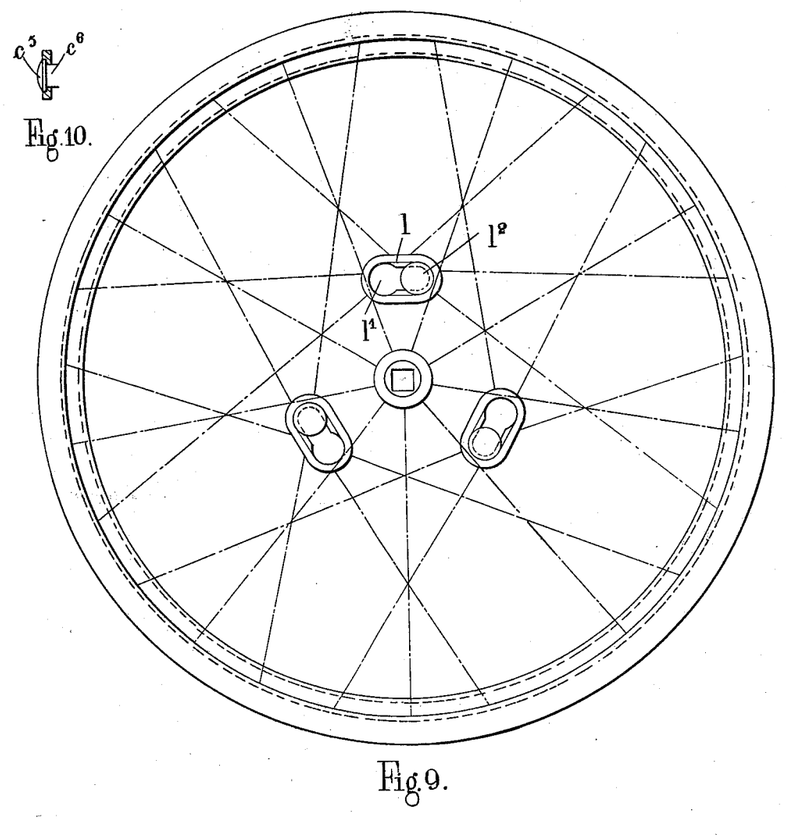

Instead of the groups of spokes upon the side of the wheel adjacent to the vehicle being engaged by adjustable attachment devices such as the studs or bolts $c$, $c'$, $c^2$, $c^3$ these groups may as shown by way of example in Figures 8, 9 and 10 be provided with keyhole or buttonhole slotted eyelets $l$ for engaging stationary heads acting as hooks or the like attached to a flange $a'$ and brake drum $b$, the eyelets $l$ in addition to having the buttonhole slots $l'$ being also recessed as at $l^2$ to accommodate a conical head $c^4$ Figure 8 or shouldered head $c^5$ Figure 10 on the bolts $c^6$.

The central abutment in this case takes the form of an adjustable spigot and shoulder $a^6$, $a^7$ screwed into the hub cap $a^8$ and having a collar $a^9$ to limit the outward movement by engaging the cap flange $a^{10}$.

The eyelets $l$ are engaged with the bolts $c^6$ and heads $c^4$ or $c^5$ while the central ring $h'$ of the set of spokes remote from the vehicle is positioned upon the spigot $a^6$ which is screwed back for the purpose by means engaging the square central socket $a^{11}$ after which the adjustable spigot and shoulder is moved outwards by opposite rotation and the wheel spokes are thus placed in a suitable state of tension. Other ways of attaching the set of spokes adjacent to the vehicle and of supporting and adjusting the set remote therefrom may also be employed for the foregoing purpose.

Figure 11:
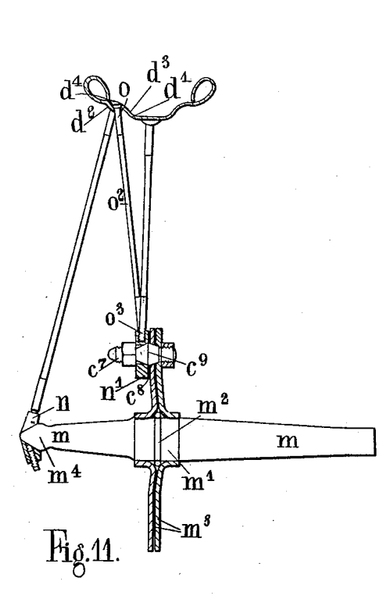
Figures 11 and 12 show a form in which the spokes are provided with heads and pass through holes in the rim to effect screw-threaded engagement with the eyelets upon a central abutment and the holding-on bolts.
Figure 12:
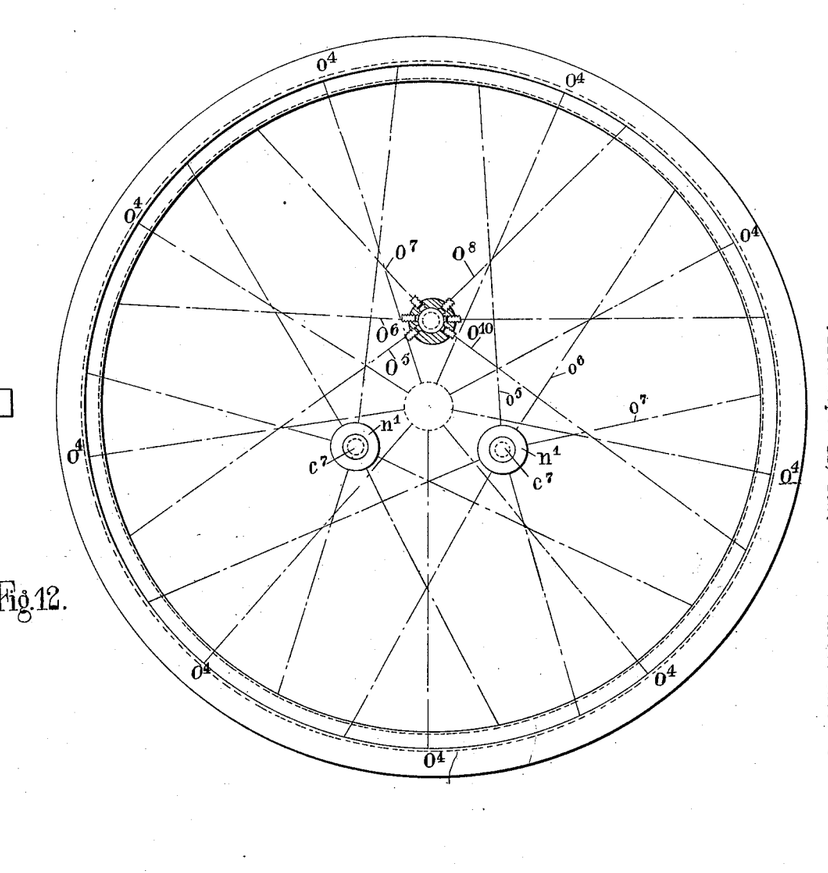

In carrying the invention into effect as shown in Figures 11 and 12 a back axle or a short axle end $m$ which is to be supported in a roller or like outer bearing member by means of which the steering is effected is provided with a serrated or like band or region $m'$ in the centre of which there is formed a groove $m^2$ of semi-circular cross section.

A split ring or the like in the groove forms a positioning means for the two discs $m^3$ which when fastened as described in the above-mentioned application constitute a flange member for driving in either direction without rotational slackness and to which the wheel part is attached.

The three bolts $c^7$ which hold the discs $m^3$ together are double ended with a central barrel portion $c^8$, $c^9$ tapering from a maximum diameter at the middle of the barrel to a smaller diameter adjacent to the threaded regions at each end of the bolts or studs. One of these tapering regions $c^9$ co-operates with slightly displaced holes in the discs $m^3$ as described in the before-mentioned application and the other tapering region $c^8$ projects together with its adjacent threaded portion $c^7$ from the outer face of the outer of the two discs $m^3$ and forms the connecting means say for a vehicle wheel.

The axle or the like $m$ extends from the serrated region $m'$ in an outward direction a distance equivalent to the length of an ordinary wheel hub and at the end there is provided a conical region $m^4$ with a blunt or rounded apex.

Upon the blunted apex cone $m^4$ and upon each of the projecting conical regions $c^8$ of the wheel part retaining bolts $c^7$ are fitted rings or eyelets $n$ and $n'$, the ring $n$ upon the axle end being provided with a number say for example nine tapped holes equally distanced around the ring and pointing in a radial direction with a slope inward from the axle end. The rings $n'$ upon the wheel part retaining bolts $c^7$ are provided each with say six tapped holes which may be unequally spaced from one another in order to accommodate the spoking arrangement hereinafter more fully described. Some of the holes in these rings are parallel to a plane at right angles to the wheel axis and others are slightly inclined to such a plane in an outward direction.

The rim for the wheel may as shown at $d'$ Figure 11 be of an ordinary central well type and be provided in the centre of the well and upon one of the side platforms or seatings with a plurality of depressed or countersunk holes $d^2$ large enough to pass the threaded ends of the spokes and with the depressions shaped as shown at $d^3$ to nicely fit out to the edges thereof the under sides of suitably shaped heads $o$ formed upon the spokes $o'$, a rim $d'$ for the arrangement described with reference to Figure 12 being provided with twenty-seven holes substantially equally spaced around the rim and inclined in suitable directions for the spoking arrangement hereafter described.

The spokes $o'$ for a wheel as indicated may suitably be made from wire swaged down between the ends as shown at $o^2$ and headed up with a flat topped head $o$ gradually merging with a curved under side out of the material of the spoke wire without any sudden change of section.

Through every third hole around the circumference and positioned in the side seating $d^4$ of the rim a spoke the centre line of which is marked $o^4$ in Figure 12 is passed and screwed into one of the tapped holes provided in the ring $n$ upon the axle end, the radial thickness of the rings $n$ and $n'$ being sufficient to provide a suitable length of fully threaded spoke in each of the tapped holes. The spokes $o^4$ form the outer set of spokes which is inclined as may be seen in Figure 11 at a somewhat smaller angle to the axis of the wheel than the inner inclined spokes. The radially directed spokes $o^4$ of the outer set are arranged so that the holding-on bolts $c^7$ for the wheel when as before mentioned three are employed come centrally between each third pair of spokes.

To the rings $n'$ fitted upon the holding-on bolts $c^7$ the inner sets of spokes are carried upon the remaining holes of the rim and each of the holding-on bolt rings or eyelets $n'$ in this particular arrangement has six spokes attached thereto. These spokes are arranged in two series of three each upon opposite sides of the ring and marked respectively $o^5$, $o^6$, $o^7$ and $o^8$, $o^9$, $o^{10}$ in Figure 12. The two central spokes $o^6$ and $o^9$ of each series are practically in line with one another and one is passed through a hole in the centre of the rim well and the other through a hole in the side seating, the holes in question being selected so that four of the holes accommodating the outer set of spokes $o^4$ lie between them around the circumference.

The other two spokes for instance $o^5$, $o^7$ and $o^8$, $o^{10}$ of each series for a given holding-on bolt ring are positioned upon opposite sides of the central spoke for instance $o^6$ and $o^9$ of the series and at somewhat different angles thereto upon the opposite sides, those on the side away from the wheel axis making a somewhat greater angle with the central spokes of their series and the stresses in the spokes being suitably proportioned to balance and position the ring, the outer spokes of each series being in each case positioned on the rim three holes away from the central spoke of the same series.

By the foregoing arrangement the three spokes of any one series for example $o^8$, $o^9$, $o^{10}$ which go to the side seating of the rim will readily pass the three spokes for example $o^5$, $o^6$, $o^7$ which go to the well of the rim of the series adjacent thereto of the next holding-on bolt ring and the swaged down central portions of the spokes facilitate this crossing without any fouling. In a transverse section such as Figure 11 the inner side spokes such as $o^5$, $o^6$, $o^7$ which go to the centre of the rim well appear as a separate set to the inner side spokes such as $o^8$, $o^9$, $o^{10}$ which go to the rim side seating and this is the case insofar as the term "sets of spokes" has been used in connection with what has been generally known as a triple spoke wheel. In the present description, however, the spokes going to the axle or hub end have been described as one "set" and the spokes going to the holding-on bolts as another "set" for the reason that these represent the two "sets" which are separated at their inner ends in an axial direction for tensioning purposes.

A wheel part when built up as hereinbefore described may have the spoke heads $o$ attached to the rim by some convenient method so that an axial movement of the ring to which the spokes are attached will not cause the heads of the spokes to protrude further through the holes into the well of the rim and thus possibly damage the tyre and so that the wheel part remains a comparatively rigid structure when taken off the hub or axle end. For this purpose the spoke heads $o$ may be soldered or brazed round the edge to the material of the rim or they may be welded at one spot or all round the edge of the flat head $o$, and as the edges of the head are gradually thinned out as hereinbefore described and shown the heads may be safely subjected to such heat treatment without having any effect upon the body portion of the spoke which is in tension and must therefore retain its full tensile strength. The spoke heads may also be held down by an encircling band or the like.

In some cases where a brake drum is employed the holding-on bolts may be attached thereto at any desired distance from the axis of the wheel within the radius of the brake drum.

Figure 13:
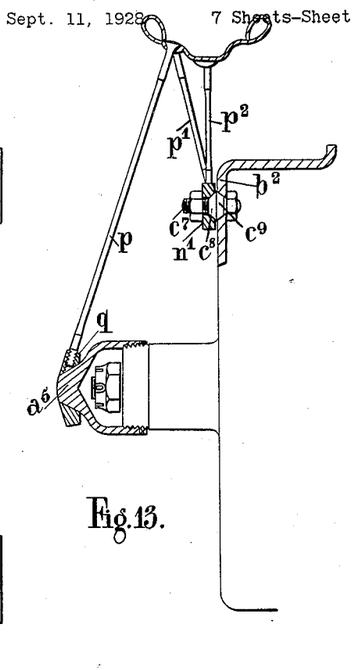
Figures 13, 14 and 15 show constructions with headed and screwed spokes as in the last-described figures and with a larger number of holding-on bolts arranged at a greater distance from the centre of rotation upon the disc part of a brake drum structure.
Figure 14:
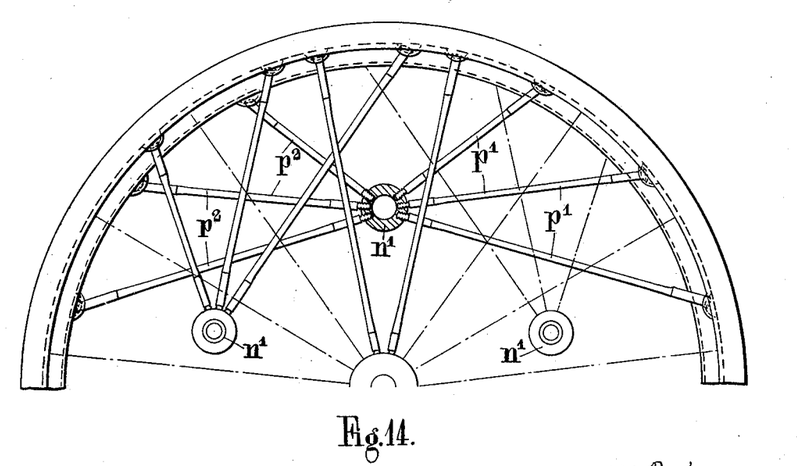
Figures 15, 17:
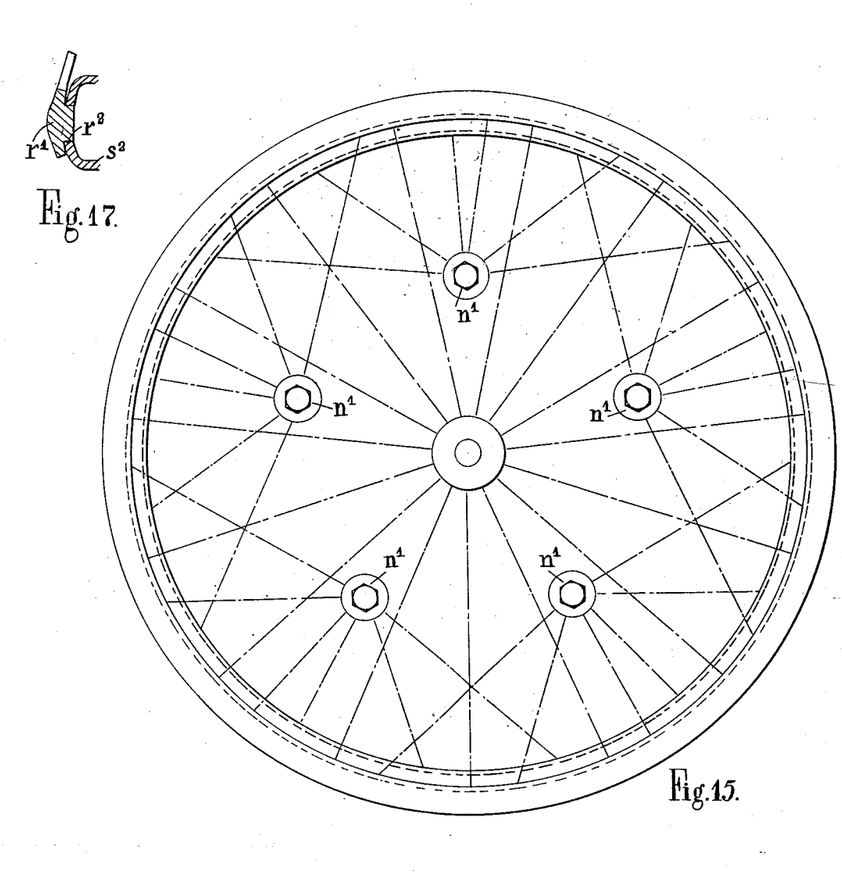
Figures 16 and 17 show modified forms of the central ring or eyelet for the outer set of spokes and the supporting means therefor.

Such arrangements are shown in Figures 13, 14 and 15 where headed and screwed spokes $p$ are shown upon the outer side of the wheel engaging a tapped central eyelet $q$ positioned upon a central conical abutment $a^5$ while headed and screwed spokes $p'$, $p^2$ upon the side of the wheel adjacent to the vehicle are shown engaging eyelets $n'$ positioned upon double-ended holding-on bolts $c^7$, $c^8$ and $c^9$ substantially similar to those described in connection with Figures 11 and 12 but with the exception that the inner conical regions $c^9$ of the bolts are positioned in tapered or countersunk holes formed in a brake drum $b^2$.

In Figure 14 the spokes $p'$, $p^2$ upon the inner side of the wheel part are shown as accurately positioning the eyelets $n'$ to correspond with the holding-on bolts $c^7$, $c^8$ while a reasonable amount of tension is maintained upon the spokes. In Figure 15, however, the resultant tension upon all of the spokes connected to any one of the eyelets $n'$ acts in a radial direction and tension cannot be present in the spokes prior to the positioning of the eyelets upon the holding-on bolts and the tightening up of the latter.

Figure 16:
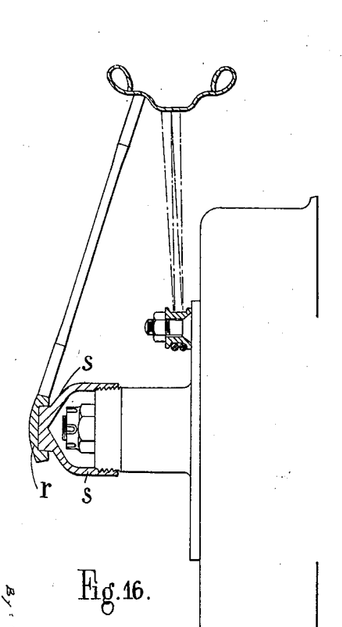

Figures 16 and 17 show modifications of the central eyelet or spoke positioning means. In Figure 16 the spoke positioning means $r$ is in the form of a cap having a recess on the side adjacent to the vehicle which is positioned upon a spigot $s$ formed at the end of a hub cap $s'$. In Figure 17 the hub cap $s^2$ is formed with a central aperture and the spoke positioning means $r'$ is formed as a disc or shield having upon the side adjacent the vehicle a plug $r^2$ which fits into the central aperture of the hub cap.

Figure 18:
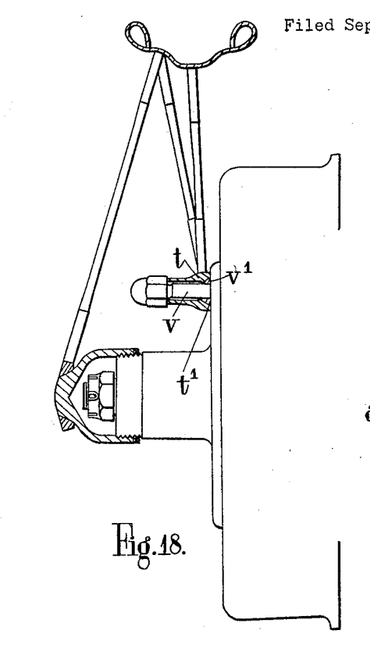
Figure 18 shows a construction similar to some of the before-described constructions so far as the outer side spokes are concerned and with the inner side spokes attached to eyelet means in the form of sleeves of a sufficient length to be positioned upon the ordinary holding-on bolts of wooden spoked, pressed steel or disc wheel constructions.

Figure 18 shows a construction similar to some of those previously described but in this case the spokes upon the side adjacent to the vehicle are attached to eyelets or rings $t$ of a sleeve-like form, the sleeves $t$ being long enough to fill the space usually occupied by the nave of a bolted-on wooden spoked, pressed steel or hollow central disc wheel the ordinary holding-on bolts $v$ for which are shown upon the drawing. The sleeve-like eyelets $t$ are provided with a conical seating $t'$ at their inner ends and these conical seatings are positioned upon a coned ring $v'$ arranged to fit tightly upon the holding-on bolt $v$.

It is to be understood that the particular wheel parts described are given by way of example and that additions and modifications may be introduced into the structure without in any way departing from the spirit of this invention.

Having now described my invention, what I claim as new and desire to secure by Letters Patent is:—

1. A wheel forming structure having sets of spokes upon opposite sides and at least one of said sets divided into groups and each group co-operating with separate means for attaching the structure to a vehicle hub, said sets of spokes being adapted to acquire suspensory, side strain-resisting and torque-resisting tensions by their relative axial displacement.

2. A wheel with sets of spokes passing from the rim inwards to spoke connection means axially separable to tension the spokes in which a central member connecting all the spokes on one side is positioned upon an abutment surrounded by a series of separate spoke connection means which coact with attachment devices to effect a retention of the wheel on the fixed hub the tightening of the attachment devices effecting final tensioning of said spokes.

3. A wheel according to claim 1 in which a set of spokes on the side of the wheel remote from the vehicle is connected to a central ring mountable upon the spigot of an axle end while the inner side set of spokes is divided to form a plurality of groups which are each connected to an eyelet, said eyelets being fitted upon a series of bolts which retain the wheel upon a fixed hub and exert tension upon the spokes.

4. A wheel in accordance with claim 1 in which the spokes of a group co-operating with an eyelet forming said attaching means are disposed symmetrically upon opposite sides thereof so that the resultant forces in the groups retain the eyelets in the correct positions to correspond with the wheel retaining devices when the wheel is being manipulated.

5. A wheel in accordance with claim 1 in which eyelets forming the attaching means are positioned upon tapering retaining devices so that tightening of the eyelets upon the retaining devices is adapted to move them in the plane of the wheel in centering them on the tapered retaining devices as well as axially to exert tension on the spokes.

6. A wheel in accordance with claim 1 in which a central spoke connection means remote from the vehicle is positioned upon a centering means provided with a shoulder-like abutment while spokes for the side adjacent to the vehicle are engaged by a series of attachment means adapted to retain a wheel and transmit driving and other forces, all the spokes being tensioned by adjustment of the axial distance between the abutment and the series of attachment means.

7. A wheel forming structure comprising a rim, a concentric nave element to one side thereof, an axial abutment engaging said nave element, spokes extending from said rim to said nave element, a series of eyelet-like members disposed around the axis of said rim, groups of spokes extending from said eyelets to said rim, and means for attaching said eyelets to a vehicle hub and effecting a relative separation of said eyelets and said nave element held on said abutment, thereby tensioning the spokes anchored in said structures.

8. A wheel forming structure comprising a rim, a concentric nave element to one side thereof, an axial abutment engaging said nave element, spokes extending from said rim to said nave element, a series of eyelet-like members disposed around the axis of said rim, groups of spokes extending from each of said eyelets to said rim divided into two clusters approximately diametrically opposite to each other, and means for attaching said eyelets to a vehicle hub and effecting a relative separation of said eyelets and said nave element held on said abutment, thereby tensioning the spokes anchored in said structures.

9. A wheel forming structure comprising a rim, a concentric nave element to one side thereof, an axial abutment engaging said nave element, headed spokes inserted through apertures in said rim and screwed into said nave element, a series of eyelet-like members disposed around the axis of said rim groups of headed spokes threaded into said eyelets through apertures in said rim and divided into two clusters approximately located on diametrically opposite sides of said eyelets to each other and the spokes of one cluster being secured to the rim in different circumferential zones than those of the diametrically opposite cluster, rotation and sliding of said spokes in said apertures being prevented by metallic fusion attachment and screw-threaded devices for attaching said eyelets to a vehicle hub and drawing said nave element against said abutment thereby exerting tension upon all said spokes.

In testimony whereof I have signed my name to this specification.

JOHN VERNON PUGH.